Oct. 10, 1967

J. P. WOODS ETAL 3,346,068

FOCUSING AND SCANNING EITHER OR BOTH OF A PLURALITY
OF SEISMIC SOURCES AND SEISMOMETERS TO PRODUCE
AND IMPROVED SEISMIC RECORD

Original Filed July 24, 1963

INVENTORS.
John P. Woods.
Emmet D. Riggs.
Clifford D. Dransfield.

BY Charles F. Steininger
ATTORNEY.

INVENTORS.
John P. Woods.
Emmet D. Riggs.
Clifford D. Dransfield.

BY *Charles F. Steininger*
ATTORNEY.

Oct. 10, 1967  J. P. WOODS ETAL  3,346,068
FOCUSING AND SCANNING EITHER OR BOTH OF A PLURALITY
OF SEISMIC SOURCES AND SEISMOMETERS TO PRODUCE
AND IMPROVED SEISMIC RECORD
Original Filed July 24, 1963  6 Sheets-Sheet 3

INVENTORS.
John P. Woods.
Emmet D. Riggs.
Clifford D. Dransfield.

BY Charles F. Steininger
ATTORNEY.

Fig. 9A.

INVENTORS.
John P. Woods.
Emmet D. Riggs.
Clifford D. Dransfield.

Fig. 9B.

INVENTORS.
John P. Woods.
Emmet D. Riggs.
Clifford D. Dransfield.

BY Charles F. Steininger
ATTORNEY.

Fig. 10.

United States Patent Office 3,346,068
Patented Oct. 10, 1967

3,346,068
FOCUSING AND SCANNING EITHER OR BOTH OF A PLURALITY OF SEISMIC SOURCES AND SEISMOMETERS TO PRODUCE AN IMPROVED SEISMIC RECORD
John P. Woods, Emmet D. Riggs, and Clifford D. Dransfield, Dallas, Tex., assignors to Atlantic Richfield Company, Philadelphia, Pa., a corporation of Pennsylvania
Continuation of application Ser. No. 297,399, July 24, 1963. This application Oct. 20, 1966, Ser. No. 596,369
26 Claims. (Cl. 181—.5)

ABSTRACT OF THE DISCLOSURE

Methods of improving seismic exploration by focusing generated seismic energy into a directional beam and/or focusing the receiving system's response pattern into a directional beam. One or both beams may be moved to locate different subsurface interfaces.

---

This application is a continuation of United States application Ser. No. 297,399, filed July 24, 1963, now abandoned.

The invention relates to a method and apparatus for improving the signal-to-noise ratio of seismic records. More specifically, this invention relates to a method and apparatus for improving the signal-to-noise ratio of seismic signals so that available seismic records can be upgraded and so that noisy or bad record country previously unsuited to seismic surveys can now be explored by the seismic technique. For purposes of this application, the term "noise" in signal-to-noise ratio includes various undesired signals such as multiple reflections, refractions, horizontally traveling waves and other disturbances originating at the seismic energy source as well as the more conventional forms of noise arriving at the receiver which do not originate at the source.

Heretofore various techniques or combinations of techniques have been used to improve the signal-to-noise ratio of seismic records made in noisy and bad record country. In this type of country, the different subsurface conditions serve to interfere with present seismic survey techniques and in certain areas these conditions prevent any intelligible interpretation of the records regardless of the technique used to improve the record. Some of the most common interfering phenomena encountered in these as well as other areas are ghost reflections, multiple reflections, complicated subsurface layer systems which tend to cause a number of reflections from different events to arrive at the same time, complicated faulting or the like, etc.

The prior art is replete with different methods and devices developed to overcome this interference. Some of these devices and methods include simple and complicated filtering circuits, stacking of shot points and/or receivers, various methods of compositing traces, cross- and auto-correlation techniques, directional shot firing such as disclosed in United States Patent 2,894,596 issued to Flatow et al. and weight dropping and continuous wave techniques.

Although these methods and devices have improved seismic records to a limited extent, they have in most cases materially increased the cost of equipment or of the survey as a whole without improving the seismic records to the degree desired.

Accordingly, it is an object of the present invention to provide an improved method for conducting geophysical exploration.

Another object of the present invention is to provide an improved method of geophysical exploration which improves the signal-to-noise ratio of seismic records regardless of whether the seismic energy is created by shot firing, weight dropping, continuous wave operations or other energy generating technique.

Another object of the present invention is to provide an improved method which materially improves the signal-to-noise ratio of the seismic record without significantly increasing the cost of operation or increasing production time.

Another object of the present invention is to provide an improved method for improving seismic records in areas where reflections from a number of subsurface events arrive at the same time.

Another object of the present invention is to provide an improved method for improving seismic records whereby faults may be accurately located.

Another object of the present invention is to provide an improved method whereby a dipping interface can be determined in the presence of multiple reflections.

Another object of the present invention is to provide an improved method for improving seismic records whereby significant reflections can be accurately located in the presence of a high degree of noise.

Another object of the present invention is to provide an improved method for producing a directional beam of seismic energy.

Another object of the present invention is to provide an improved method for focusing the response pattern of a receiving system.

Another object of the present invention is to provide a method that can scan portions of the subsurface.

The present invention achieves its significant improvement in signal-to-noise ratio by focusing the transmitted energy from a given source and the response pattern of a receiving system into directional intersecting beams that illuminate a given volume of the earth's subsurface. More specifically, by using a spatial arrangement of the energy transmitting source and the receiving system together with appropriate time delays, the transmitted energy can be focused to illuminate the volume of the subsurface and the receiving system can be made highly sensitive to the energy reflected from an interface within the volume. This, of course, also makes the receiving system relatively insensitive to noise. The illuminated volume of the subsurface can be selected in a predetermined manner or one or both of the beams can be used to scan for various volumes of the subsurface.

The general arrangement and other objects of the invention may be more readily determined by reference to the drawings wherein.

Figure 1:
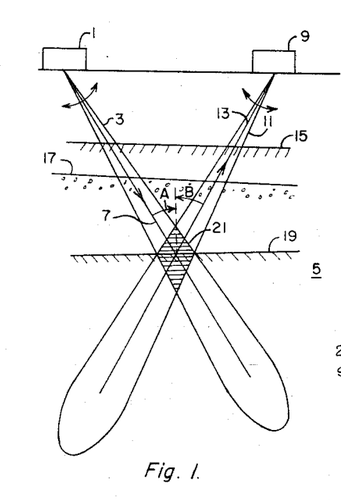
FIGURE 1 illustrates the use of a beam of transmitted energy and a receiving system's response pattern to illuminate a volume of the earth's subsurface.

To better understand the invention, refer to FIGURES 1 through 4. These figures illustrate some of the ways the invention may improve the signal-to-noise ratio of records made under commonly occurring conditions which make conventional seismic records difficult or even impossible to interpret. FIGURE 1 shows a highly simplified diagram of energy source 1 transmitting directional beam 3 of seismic energy into subsurface 5. The center of the directional beam is represented as ray 7. Directional receiving system 9 is shown with its response pattern focused into beam 11 with the center of the beam shown as ray 13. Although the beams are shown focused into straight patterns, it should be understood that both beams are actually bent as they traverse interfaces between subsurface layers having different physical properties. Various subsurface interfaces 15, 17 and 19 are shown in simplified manner to illustrate a multilayer subsurface portion 5 of the earth. The intersection of beams 3 and 11 serve to illuminate a volume of the subsurface represented as 21 and cross-hatched for purposes of emphasis. For purposes of simplification, both beams are shown as approximately equal in width, but in actual application either transmitting or receiving beams may vary in width as operating condition dictates. Beams 3 and 11 are shown with arrows which indicate that the beams can be moved individually or simultaneously through subsurface 5 as desired. In the remaining figures, elements similar to those illustrated in FIGURE 1 are identified by corresponding numbers.

Figure 2:
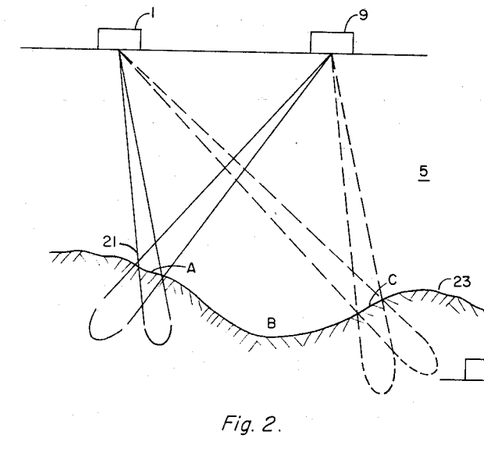
FIGURES 2 through 4 show the operation of the invention under various illustrative conditions.

FIGURE 2 is a simplified example of the subsurface 5 containing an undulating interface 23. This type of subsurface, when examined by a conventional seismic operation, normally causes a plurality of reflections to be recorded on a seismogram at the same time position. As an example, the reflection from points A, B, and C may arrive at the seismometers at the same time and therefore present a complex wave which is normally unintelligible. However, utilizing the present invention, only one portion of the interface is illuminated during one operation. This portion is contained within illuminated volume 21. Therefore, because of the focusing process, receiver system 9 is highly sensitive to the reflection originating from portion A of the interface 23 within volume 21 and relatively insensitive to the reflections received from points B and C and other noise.

Figure 3:
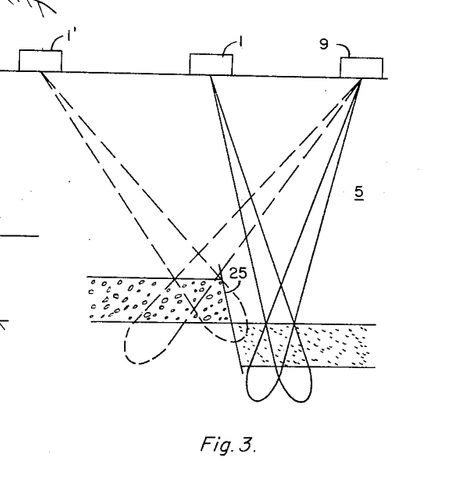

FIGURE 3 is a simplified example of a fault shown as interface 25. In conventional seismic operation, the exact location of this fault is either difficult or impossible to accurately determine. The seismic energy is reflected from the various portions of interface 25 as well as the interfaces adjacent the fault. Since all of the reflections will arrive approximately at the same time, the accurate location of the reflection representing the faulted portion is hidden in the resulting wave complex. FIGURE 3 shows the use of the subject invention to illuminate a single portion of the interface at one time so that reflections from other portions are excluded or materially reduced. The dashed beams illustrate one manner in which various portions of the interface can be illuminated.

Figure 4:
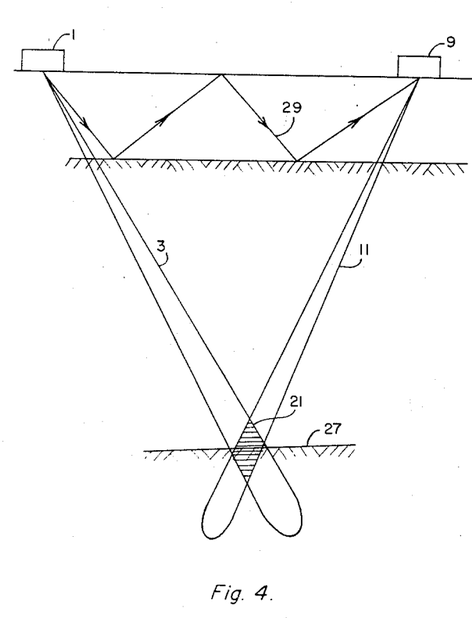

FIGURE 4 is a simplified example of how the invention locates dipping interface 27 in the presence of "multiples" 29. Note that focused beams 3 and 11 make receiving system 9 relatively insensitive to multiples 29 and very sensitive to the reflections originating from the dipping surface within illuminated volume 21.

Of course, the inventive concept is equally applicable in other situations as will be obvious to those skilled in the art; however, for purposes of brevity only the above are illustrated.

Consider now the inventive aspects of the focusing and scanning operations as used in applicants' methods.

Focusing

As pointed out heretofore, the focusing operation serves to increase the signal-to-noise ratio of seismic signals so that areas heretofore unsuited for seismic prospecting can now be profitably surveyed. From illustrative FIGURES 1 through 4, it can be seen that the transmitted seismic energy is focused into a beam and the response pattern of the receiving system is focused into a second beam so that a volume of the subsurface is illuminated at the intersection of the two beams. This illumination makes the receiver system extremely sensitive to seismic energy reflected from the interface or interfaces contained therein and relatively insensitive to reflections and noise from other portions of the subsurface. The directional beam from the source focuses the maximum amount of energy onto the interfaces, thereby reflecting significant portions of the energy back into the focused response pattern of the receiving system.

The seismic energy source can be focused regardless of the type of source used and the focusing operations can be conducted in the field or in the office.

Looking at the focusing process illustrated in FIGURE 1 in more detail, the center of beam 3 is represented by ray 7 and the center of beam 11 is represented by ray 13. The reflection of beam 3 from interface 19 back to receiver 9 is in accordance with the law of reflection in that the angle of incidence A equals the angle of reflection B. The complex process involving the approach of a directional compressional wave, represented by beam 3, to velocity-density interface 19 and the generation of reflected wave types and refracted wave types obey the physical principles satisfying (1) The law of reflection and refraction discussed above, and (2) Huygen's principle.

Huygen's principle, in brief, states that a wave passing through a medium acts in a manner such that every vibrating point on the wave front is regarded as the center of a new disturbance. The new secondary wavelets thus formed create a new surface identical in its properties with the surface from which it was formed. The sum of the advancing wavelets form a new surface which is the new wave front made directional by the summation. Applicants' exploration technique is usually practiced with the utilization of the compressional form of body waves generated at the reflecting interface; however, it need not be limited to this form of wave energy since transverse or shear waves can be utilized. If the receiver is sensitive to the shear component of the reflected wave generated from an incident compressional wave, of course, the angle of reflection is altered accordingly.

A more complete treatment of how the individual waves combine to produce a directional wave according to Huygen's principle can be found on pages 325–331 of Seismic Prospecting for Oil by Dix, copyrighted 1952.

Figure 5:
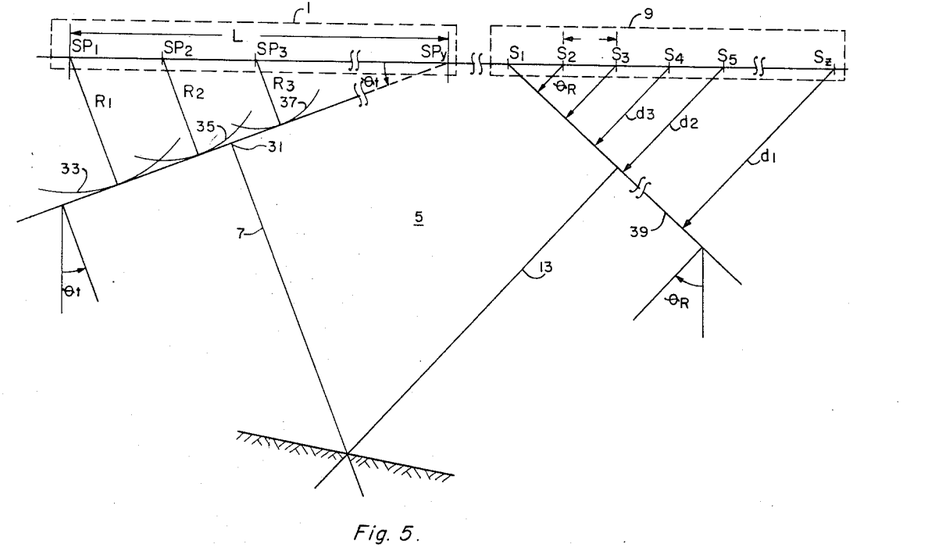
FIGURE 5 is a schematic representation of the focusing operation.

To illustrate the directional aspects of source 1 and receiver 9 and the application of the principles discussed above, refer now to FIGURE 5. Directional energy source 1 is schematically represented as shot points $SP_1$ through $SP_y$. Receiving system 9 is represented as seismometers $S_1$ through $S_z$. The seismic energy transmitted from 1 is focused into a directional beam the center of which is represented by center ray 7. The various sources of energy $SP_1$ through $SP_y$ are actuated in a sequential manner to produce directional plane wave front 31. As shown in the simplified schematic drawing, this wave front is the summation of individual seismic energy wave fronts represented as 33, 35, 37, etc., which are sequentially produced from shot points $SP_1$ through $SP_y$. The direction of wave front 31 represented by ray 7 is determined by the delay times between firings of shot points $SP_1$ through $SP_y$. More specifically, to produce the desired angle $\theta_t$, the delay times are such that at any given moment respective radii $R_1$, $R_2$, $R_3$, etc. of individual wave fronts 33, 35, 37, etc. are the proper length to focus wave 31 according to Huygen's principle. As will be described in more detail hereinafter, the exact radii or delay times can be determined by basic geometrical principles. That is, $$\sin \theta_t = \frac{R}{L}$$

where R is the instantaneous radius of a particular wave front in a group of wave fronts that combine to form the directional wave and L is the distance between the source of the particular wave front and the end of the over-all source adjacent the receiving system. In determining the delay time in seconds for the particular wave front, the appropriate radius R is divided by the velocity of the appropriate subsurface.

Applicants have discovered that if seismic source 1 is the continuous wave type (referred to hereinafter as CW) instead of the impulse type, the same general principles will apply; however, the delays used must be a function of time instead of phase unless the energy output of each of the several sources is precisely controlled in phase and in waveshape throughout the duration of each generated wavetrain. Since the particular type of CW source (and control) used determines to an extent where and how the focusing is practiced, to facilitate further discussion, the CW type sources are classified as follows: (a) a plurality of CW generators each located at a spaced interval, and the plurality simultaneously driven, precisely controlled in frequency and operated on by a variable delay means; (b) a single CW generator controlled precisely in frequency variation and moved from position to position; and (c) a single CW generator with no precise control moved from position to position. If type source (a) is used, the focusing can be accomplished while the seismic energy is in continuous wave form or it can be accomplished after the seismic signals are recovered from the continuous wave signals. If type source (b) is used, the focusing can be done while the seismic signals are in CW form or after the seismic signals are recovered. If CW source (c) is used, the focusing must be done after the seismic signals are recovered. If focusing operations are accomplished while the seismic signal remains in CW form, the beam width of the transmitted energy will vary according to the carrier frequency and individual cycles of the carrier must be delayed in time so that wave front 31, FIGURE 5, represents the position of a particular cycle at a specific instant in time. If the focusing is practiced after the seismic signals are recovered, the recovered traces are focused by adjustment of relative time delays and the relationship of individual cycles of the continuous wave are of no importance to the process.

If focusing is accomplished prior to recovery of the seismic signal using type source (a), the focusing must be practiced in the field. However, type source (b) may be focused either in the field or in the office before the seismic signal is recovered. For purposes of this application, the term "in the field" shall mean in the recording and other processing vehicles that accompany personnel producing the seismic records. The term "in the office" shall mean all locations other than "in the field."

The response pattern of receiver system 9 can be focused by delaying and adding the output of each of respective seismometers $S_1$ through $S_z$. The focusing can be accomplished in the field or in the office; however, it is highly desirable to recover the seismic signals before the response pattern is focused. As will be described in more detail hereinafter, the desired method of receiver focusing can be practiced singularly or in combination with the desired method of source focusing.

The delay times necessary for the particular method of focusing the receiver system are determined in a manner similar to that described in focusing the source. In FIGURE 5, ray 13 represents the direction of the response pattern of the system, $\theta_r$ represents ray 13's direction or deviation from the vertical, $d_1-d_z$ are the necessary delay times to produce angle $\theta_r$. When the response pattern of the receiving system is considered in terms of a wave front, it can be represented as 39.

Of course, source 1 or receiver system 9 can be made directional without the other being made directional and still improve the signal-to-noise ratio in the area being prospected. However, when both are made directional, the signal-to-noise ratio is improved more significantly.

*Scanning*

The scanning operation allows the focusing technique used by the source and/or detector to search or investigate a subsurface area or sector. The scanning system itself is a means for adjusting the direction of the focused beam or beams, that is, a system for varying angle $\theta_t$ and $\theta_r$ as desired.

The scanning operation can be conducted partially or wholly in the field or in the office and is not limited to a particular type of energy source or receiving system.

Various techniques can be used to conduct the scanning operation. For instance, the transmitted beam or the receiver's response pattern can scan a sector of the subsurface while the other remains stationary or both can scan simultaneously. If one beam is used to scan, it is not essential that the other be focused; however, focusing does increase the over-all signal-to-noise ratio for reasons discussed heretofore.

The actual scanning operation can be conducted in a manner somewhat similar to the focusing operation; however, since the direction of the beam is moved in scanning operations, a new set of delays must be used for each new directional angle $\theta$.

Figure 6:
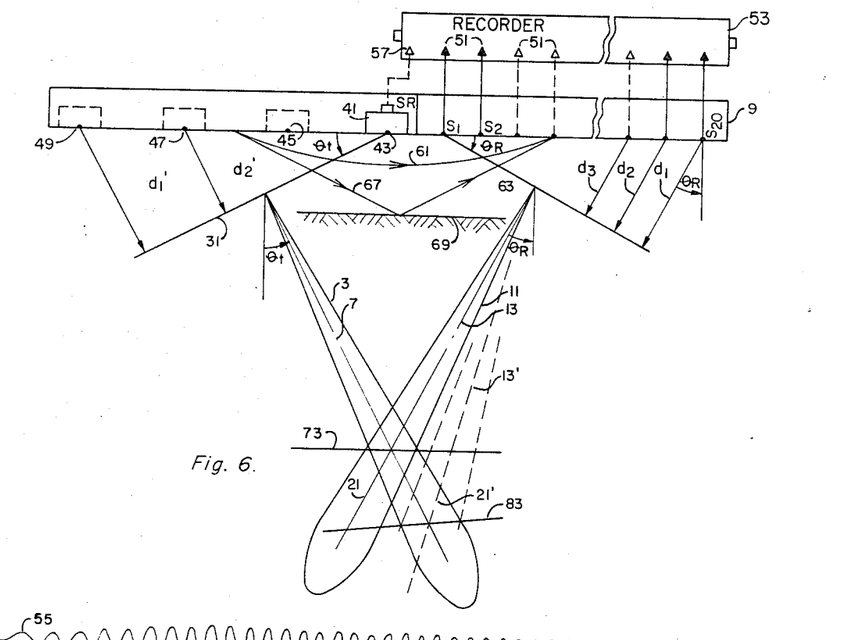
FIGURES 6 and 7 present a schematic representation of the operation of the over-all invention.
Figure 7:
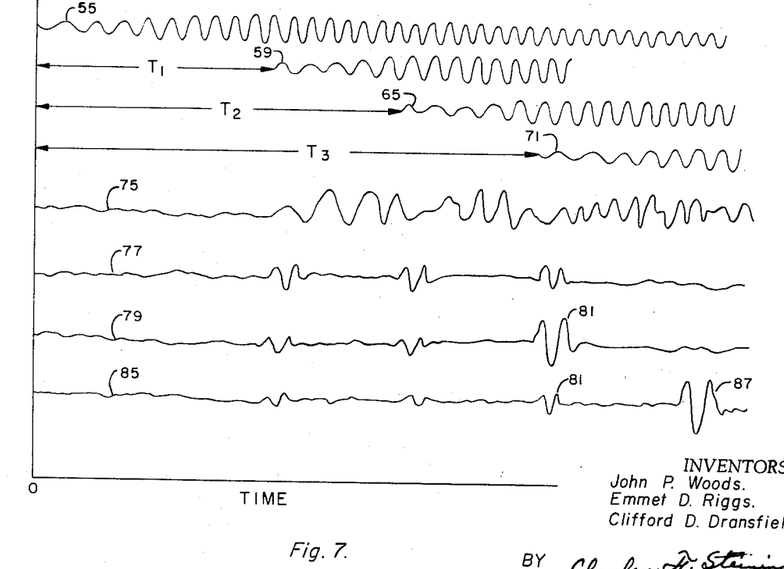

FIGURE 6 is a schematic drawing, not to scale, illustrating one embodiment of the invention. FIGURE 7 shows in simplified form representative wave forms produced by this embodiment of the invention. This particular embodiment contemplates the use of a single variable frequency CW source, with a receiving system layout of twenty seismometers, or twenty seismometer patterns as desired. The seismic energy source and the response pattern of the receiving system are focused into directional beams in the office after initial field recording operations. The scanning operations are also conducted in the office. Directional energy source 1 is shown to include CW source 41 located at position 43 and second, third and fourth positions 45, 47 and 49. The source positions are shown spaced 500 feet apart. Directional receiving system 9 is shown to include seismometers $S_1$ through $S_{20}$ connected along a cable 1320 feet in length. The output of each seismometer or seismometer pattern is connected to a separate recording head 51. All of the recording heads are adapted for simultaneous recording on magnetic drum 53.

In operation, source 41 is initially positioned at 43 and actuated so that a frequency varying continuous wave signal is transmitted into the ground for a period of about five seconds. A simplified, illustrative frequency varying continuous wave signal is shown as 55, FIGURE 7, and the signal may be programmed to vary from say, 20 to 80 to 20 c.p.s. over the five second period by a device such as shown in United States Patent 3,229,784, owned by a common assignee. As signal 55 is generated, it can be received by reference seismometer $S_r$ attached to the vibrator and recorded as the reference trace by magnetic head 57 on drum 53 or it may be recorded independently at a different time on the drum and used to program the source. Seismometers $S_1$ through $S_{20}$ receive the generated signal from various paths through subsurface 5 and their outputs are recorded on drum 53 as individual traces by their respective heads 51. To better illustrate the components that go into making up a total seismic wave complex as seen by a seismometer and recorded as a trace by head 51, signal 59 is shown to represent the leading portion of transmitted signal 55 that travels as a refracted wave along path 61, through weathered layer 63. Signal 65 represents the leading portion of 55 that is reflected along path 67 from interface 69. Signal 71 represents the leading portion of 55 that travels along 7 and is reflected from interface 73 and back along 13. Of course, in actual practice portions of 55 would also be reflected from many other interfaces. For purposes of illustration, wind noise and other interference are not shown and the over-all signals are simplified. $T_1$ represents the travel time for the initial portion of 59 to reach seismometer $S_1$ and $T_2$ and $T_3$ represent the respective travel times of 65 and 71. Signal 75 represents the total seismic wave complex, in simplified form, reaching seismometer $S_1$ and includes the sum of 59, 65 and 71 plus noise and other reflections not shown. As stated above, seismometers $S_2$ through $S_{20}$ also receive somewhat similar signals with different travel times and heads 51 record the seismometer outputs as twenty traces on drum 53. Source 41 is moved to position 45 and a second seismogram containing 20 traces and one reference trace is recorded as above. Source 41 is repeatedly moved to new positions until the traverse is complete. In the illustrated embodiment, 41 is moved through positions 43 through 49 before the seismometers in receiving system 9 are moved to a new position along the general line of traverse. At each position a new seismogram is recorded and at each new receiving system position a new set of seismograms are recorded. After the desired number of seismograms have been produced, it is necessary to recover the seismic signals, in amplitude varying form, from the 20 continuous wave signals such as 75, recorded as traces on each seismogram. This can be done by "pattern matching" reference signal 55 on the seismogram with each individual continuous wave trace 75 on the particular seismogram. This "pattern matching" operation is described in detail in United States Patent 2,982,371 issued to Woods et al. The recovered seismic signals, which are rerecorded as seismic traces in "wiggly line" form on the new seismogram, are similar to illustrative trace 77, FIGURE 7. Note that although the pattern matching operation has eliminated a certain amount of wind noise and interference, all of the reflections, refractions, multiples, ghosts, etc., and some noise remain in the trace. For reasons set forth in the discussion of FIGURES 2 through 4 and for various other reasons well-known to those skilled in the art, these remaining reflections, multiples, ghosts, refractions, etc. often combine and interact so as to make record interpretation difficult to impossible depending on the subsurface conditions of the area being surveyed. The subject invention improves the signal-to-noise ratio in such records by (1) significantly reducing seismic energy and noise coming from outside a particular subsurface volume of interest, and (2) by increasing the strength of the seismic energy reflected from within this volume of interest. This improvement is achieved by focusing the transmitted beam of seismic energy and the response pattern of the receiving system so that the volume of interest is within the intersection of the two beams. The portion of interface 73 shown within the volume of interest 21 is illuminated by the intersection of transmitted beam 3 and response pattern 11. With the completion of the focusing operation as described in detail hereinafter, the reflection from interface 73 appears as event 81 on illustrative trace 79. Note that with the response pattern of receiving system 9 focused into narrow beam 11, horizontally traveling wave 59 moving along path 61 and reflected wave 65 traveling along path 67 are not within the system's zone of high sensitivity and are no longer recorded as significant events. Since the transmitted energy is focused into beam 3, much more seismic energy is reflected from interface 73 and received by beam 11 to produce significant event 81 representing the accurate location of interface 73. Of course, if more than one interface appears in the illuminated volume, the corresponding number of reflections will appear as significant events on trace 79. The dimensions of the illuminated volume are determined by angles $\theta_t$ and $\theta_r$ and by the width of beams 3 and 11. As will be discussed in detail hereinafter, the behavior and dimensions of the beams are governed by established antenna theory.

Consider now the details of in-the-office focusing of the continuous wave seismic signals recorded in pattern matched form on a seismogram where each record trace resembles trace 77, FIGURE 7. If it is desirable to focus the response of receiver 9 at angle $\theta_r$, FIGURE 6, trace 1 of the seismogram received by seismometer $S_1$ must be delayed in time by an amount proportional to $d_1$. Similarly, traces 2, 3, etc. of the seismogram are delayed by amounts $d_2$, $d_3$, etc., respectively, until the reflection from interface 73 on each trace is in alignment timewise with corresponding reflections on the other traces in the seismogram. The traces are then added to produce illustrative trace 79 wherein reflection 81 representing interface 73 is accentuated as a dominant event and the remaining portions of the trace are de-emphasized by cancellation.

To focus the transmitted beam 3, the same general procedure is utilized except that appropriate delays $d_1'$, $d_2'$, etc. are used to form the desired angle $\theta_t$. It should be remembered at this point that a seismogram is made at each CW position 43, 45, 47, 49, etc. Therefore, to focus the transmitter, the traces appearing on seismogram made at position 43 are delayed by an amount $d_1'$; the traces on the seismogram made at position 45 are delayed by an amount $d_2'$; etc.

If it is desirable to focus both the transmitted beam and the receiver system simultaneously, then, trace 1 of seismogram 1 would be delayed by an amount equal to $d_1+d_1'$ seconds. Trace 2, seismogram 1, would be delayed by $d_2+d_1'$. Trace 3 would be delayed by $d_3+d_1'$, etc. Trace 1 of seismogram 2 would be delayed by $d_1+d_2'$ and trace 2 would be delayed by $d_2+d_2'$, etc.

Other portions of interface 73, FIGURE 6, as well as other interfaces can be located by scanning beams 3 and/or 11. For purposes of simplicity, only beam 11 will be moved in the scanning operation discussed here. To practice the scanning operation, the delay times defining angle $\theta_r$ are varied causing the response pattern and center ray 13 to move to the position illustrated in dashed form illuminating dashed volume 21' containing interface 83. Since interface 83 is now reflecting energy from the source to the receiver, reflection 81 on trace 85 is significantly reduced in size and the reflection 87 from interface 83 is the dominant event on the trace. Of course, the reproduction of trace 85 can be made on a suitable recorder as well as on the face of an oscilloscope. The delay times used to produce the new $\theta_r$ can be determined as discussed heretofore or can be generated by moving the system through a series of delay combinations until reflection 87 appears as a significant reflection on the oscilloscope or other appropriate visual monitoring device.

Figure 8:
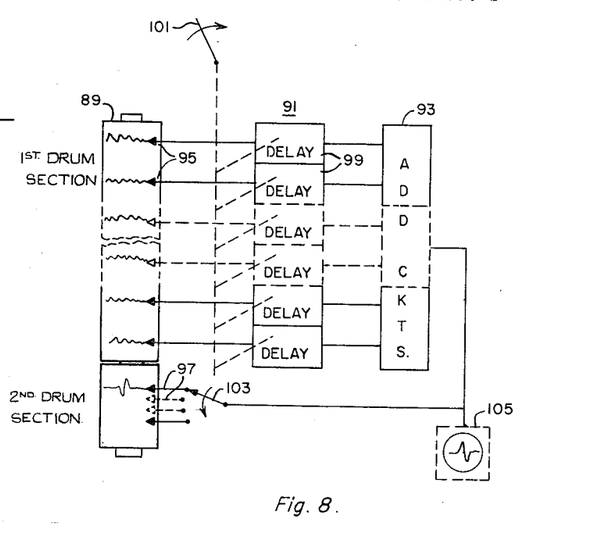
FIGURE 8 is a simplified block diagram of a device capable of practicing the invention.

FIGURE 8 discloses a block diagram of one device capable of practicing the focusing and scanning operation. For purposes of simplicity, only the essential elements are shown in block form and include recording drum 89, variable delay means 91, and add circuit 93. The recording drum as shown includes a first record section with a plurality of magnetic transducers 95 and a second record section with a plurality of magnetic transducers 97. Delay means 91 includes a plurality of variable delays 99 where each variable delay is connected to the output of a magnetic transducer 95. Variable delays 99 are ganged to an adjusting mechanism 101 which allows desirable delay times to be placed in the respective delays 99 by conventional means. Add circuits 93 are connected to the outputs of variable delays 99. The add circuits can be of conventional type and the output of 93 is connected through switch means 103 to the desired magnetic transducer 97. The output of 93 is also connected to an optional oscilloscope 105. For purposes of simplicity, certain components such as power sources, amplifiers and demodulators and modulators when appropriate, are not shown since their use is obvious to one skilled in the art.

To practice in-the-office focusing and scanning operations described above on the system shown in FIGURE 8, the following technique can be used. The seismogram produced at position 43, FIGURE 6, and modified to contain recovered seismic signals 77 is placed on the first section of drum 89, FIGURE 8. Mechanism 101 is adjusted to enter the appropriate time delays in delays 99 to form angle $\theta_r$, FIGURE 6, thereby focusing receiving system 9. The recovered traces on the first seismogram on drum 89 are simultaneously played out, delayed, added and rerecorded as a single trace on the second section of drum 89. This operation is repeated for each of the four seismograms made at positions 43 through 49, producing a total of four traces on the second section of the drum. It should be noted at this point that the delay times entered for each new sesismogram to produce $\theta_r$ will be different since each seismogram is made at a new transmitter position. The four summed traces recorded on the second section of the drum are now removed and replaced on the first section of the drum. Reflection 81 from interface 73, FIGURE 6, appears as the significiant event on each of the four summed traces. However, since the source has not been focused, the reflections from 81 are not in alignment timewise. Therefore, to focus the source, the appropriate time delay is entered in each of delays 99 to form $\theta_t$ and to line up these particular reflections. The four traces are then played back simultaneously through the delays, added and recorded as a single trace on the second section of the drum. The final trace on the second section of the drum will appear generally as trace 79, FIGURE 7, with reflection 81 appearing as the significant event with maximum amplitude.

In order to scan from interface 73 to interface 83, FIGURE 6, the following procedure can be practiced. The seismogram containing the recovered seismic signals originating from position 43 is placed on the first section of drum 89. Mechanism 101 is moved in a direction to vary the time delay in a decreasing manner thereby changing $\theta_r$, FIGURE 6, until beam 11 moves to the dotted line position shown. As the delays are moved, the operator observes the output of 93 in oscilloscope 105 until a second significant event that is similar in shape to 81 but removed in time appears on the scope. At this point, angle $\theta_r$ has been varied to focus 11 on interface 83 as shown by dotted line, FIGURE 6. The output of 93 is recorded on the second section of the drum as a single trace after the focusing operation. This process is repeated for the three remaining seismograms made at positions 45, 47 and 49. The record containing the four new summation traces is now placed on the first section of the recording drum 89, FIGURE 8, so that the source's output beam 3, FIGURE 6, can be moved to the new interface. Of course, in the simplified case, shown in FIGURE 6, beam 3 is already focused on interface 83. However, if it were not so focused, 101, FIGURE 8, would be moved in a manner to decrease the delay times until the reflection from the new interface was at a maximum. At this point, the delays entered at 91 form the new $\theta_t$ and the output is recorded as a single trace on the second section of drum 89. With the receiver and the source focused on new interface 83, FIGURE 6, the trace, as recorded, appears as 85, FIGURE 7, with reflection 87 representing the reflected energy from the new interface. Further scanning by either or both of the beams is conducted by moving these beams in the appropriate directions.

Figure 9A:
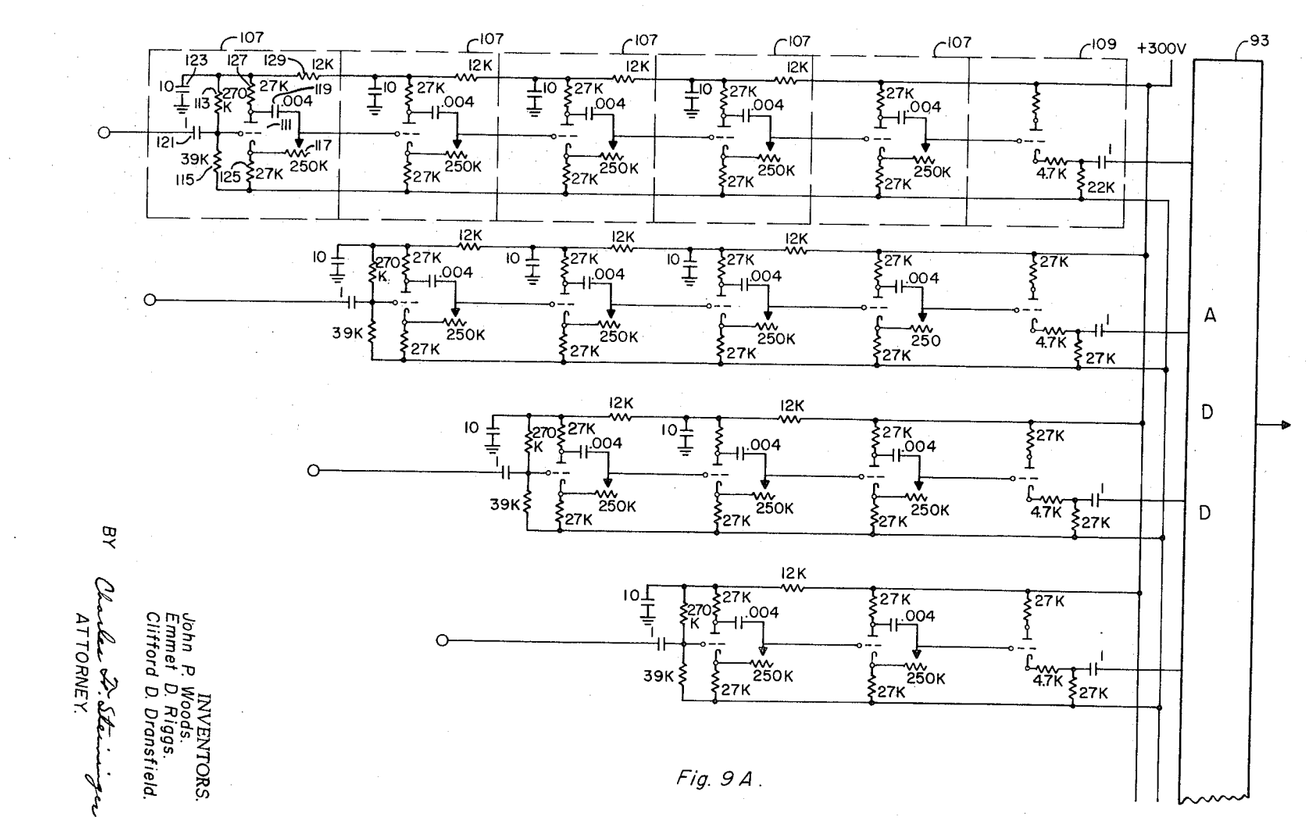
FIGURES 9A and 9B present a circuit diagram of one instrumentation of FIGURE 8.
Figure 9B:
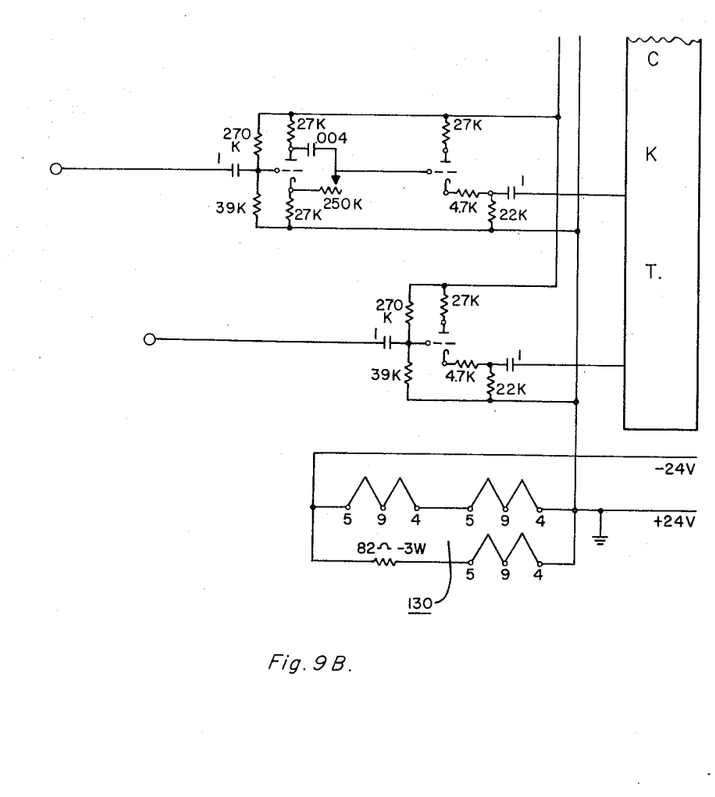

FIGURES 9A and 9B show one means for instrumenting the system shown in FIGURE 8. The device as shown in FIGURES 9A and 9B is designed to individually or simultaneously process six traces and the delay limits have been arbitararily set to range from 0 to 5 milliseconds. The circuitry preceding add circuit 93 forms the variable delay system 91, FIGURE 8. In FIGURE 9A, each horizontal series of components in the delay system corresponds to a variable delay 99, FIGURE 8. Each delay 99 is made up of a series of components. The uppermost variable delay is set off in dashed blocks and includes delay units 107 and an impedance matching unit 109. Each delay unit 107 can be adjusted to enter from 0 to 1 millisecond of delay and each variable delay 99 includes a different number of units so that the total delay entered in each of the six traces can be varied by different amounts. The output of each impedance matching unit is connected to add circuit 93 and the output of 93 may be connected to a recorder, scope, or other type of presentation means.

Each delay unit 107 includes triode 111, a voltage divider made up of resistors 113 and 115 connected to the grid of the triode, a capacitive coupling circuit connected between the plate and the cathode of the triode comprising potentiometer 117 and capacitor 119, coupling capacitor 121, decoupling capacitor 123, cathode resistor 125, plate resistor 127, and decoupling resistor 129. All of the potentiometers 117 in this horizontal series of connected delay units are ganged in such a manner as to produce a total delay of from 0 to 5 milliseconds. In the adjacent horizontal variable delay 99, delay units 107 are connected so as to enter from 0 to 4 milliseconds of delay. The third horizontal circuit can enter from 0 to 3 milliseconds of delay, the fourth horizontal circuit from 0 to 2 milliseconds of delay, and the fifth horizontal circuit from 0 to 1 millisecond of delay. Add circuit 93 is a conventional resistive-type network combining the outputs of the five delays in a conventional manner.

The heater connection of triodes 111 are schematically represented in block 130, FIGURE 9B, as conventional series-parallel connections. Since 11 twin triode-type vacuum tubes are used, 10 tubes are connected with the heaters in series-parallel conections and a series resistor is used with the remaining tube.

In operation, a seismic signal is fed to each of the variable delays 99. The voltage divider made up of 113 and 115 establishes a bias on the grid of triode 113 and the signal drives the grid so that the triode and its capacitive coupling acts as a phase splitter to enter the desired amount of incremental delay. Assuming that it is desirable to enter 5 milliseconds delay in the uppermost variable delay, potentiometer 117 is adjusted in a manner so that the capacitive coupling achieves 1 millisecond delay over the seismic range of frequencies. This delayed signal is coupled through the remaining delay units 107, each of which further delays the signal by 1 millisecond. The other variable delays act in a similar manner according to the setting of their particular potentiometers.

Figure 10:
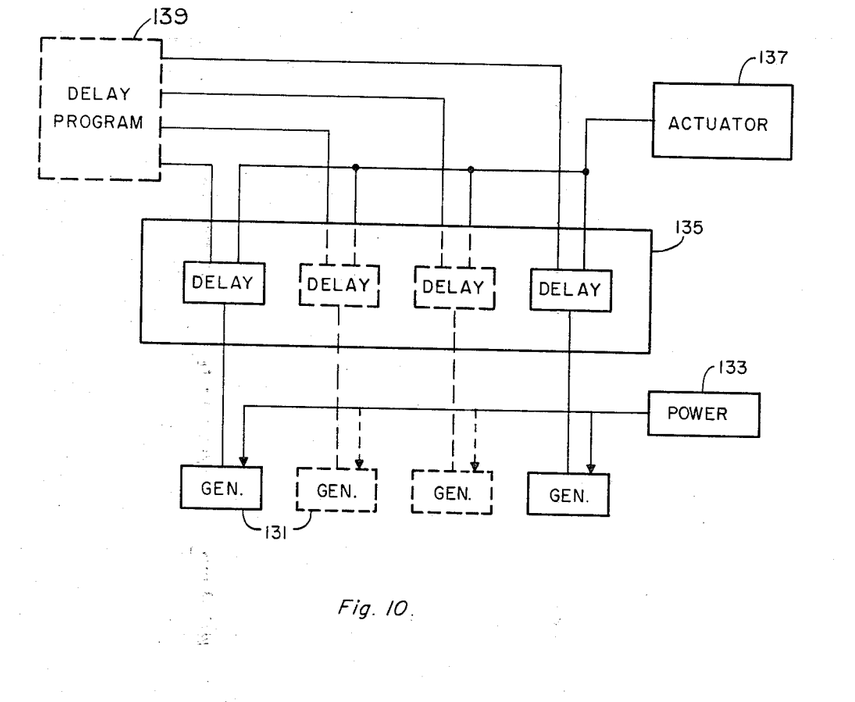
FIGURE 10 is a block diagram of one device capable of focusing transmitted energy in the field.

FIGURE 10 is a simplified block drawing of one instrumentation of source system 1, FIGURE 1, capable of focusing and scanning in the field. This instrumentation can be used singularly or in conjunction with a device capable of field or in-the-office receiver focusing such as shown in FIGURE 8. For field focusing, delay 91, FIGURE 8, would be connected directly to the seismometers instead of through drum 89 as shown. The instrumentation shown in FIGURE 10 includes a plurality of seismic energy generators 131 with their appropriate power source 133, variable delay system 135 and an appropriate actuator 137 for the generators. Generators 131 can be shot points, continuous wave generators, weight dropping devices or other type seismic energy sources. The variable delay system 135 includes a series of suitable variable delays, each delay appropriately connected between a generator 131 and actuator 137. The delays in 135 can be ganged in such a manner that the appropriate delays can be manually or automatically set to produce the desired focusing and/or scanning angles. Optional delay programmer 139 enables a desired set of delays or series of delays to be automatically entered in 135 when automatic focusing or scanning is desired. Actuator 137 can be a suitable means for firing shot points, actuating a weight or actuating and programming the frequency of CW generators. Since all components discussed above are individually well-known to those skilled in the art, further description is not required.

Although for purpose of illustration one embodiment of the invention has been specifically described as operating under a given set of conditions and using particular steps and equipment, it should be understood that numerous modifications and substitutions can be made by those skilled in the art without departing from the inventive concepts.

The size, type, make-up and configuration of the energy source and the receiver system need not be limited except that their over-all longitudinal axes should be generally in line with each other and in the general direction of the traverse being conducted. The type of variable delay system used can be electrical, mechanical, magnetic, etc.; however, in most cases a suitable magnetic delay drum, well-known to those skilled in the art, will be most satisfactory.

Although the reference trace or signal used in the CW operations is shown received from a reference seismometer adjacent the source, it should be understood that with proper control facilities to keep the generated signal in phase with the reference signal, the reference trace can be prerecorded and not received during the actual conduct of the traverse. Additionally, the invention is not limited to using the pattern matching method of recovering seismic intelligence from the continuous wave signals. For instance, the correlation procedure utilized in Patent No. 2,688,124 to Doty or other appropriate correlation procedures can be used to recover the seismic signals.

Accordingly, the scope of the present invention is limited only by the appended claims.

We claim:

1. A method of using a focused response pattern of a receiving system containing a plurality of seismometers to investigate the earth's subsurface comprising the steps of
   (a) generating seismic energy at at least one point displaced from the receiving system,
   (b) developing at the plurality of seismometers output signals created by the receipt of said generated seismic energy,
   (c) focusing the receiving system's response pattern into a directional beam intersecting the path of at least a portion of the generated seismic energy at an interface in the subsurface by adjusting the reflections in said output signals from said interface to a common point in time whereby a major number of reflections from other subsurface interfaces are out of adjustment, and adding said output signals,
   (d) presenting the sum as a function of travel time wherein a dominant event in said sum represents the energy from said interface, and thereafter
   (e) scanning a portion of the subsurface by moving said beam through a subsurface sector whereby reflections from interfaces within said subsurface sector are presented as newly appearing dominant events in accordance with the movement of said beam and the location of said interfaces within said sector.

2. In a method as set forth in claim 1 wherein the method is practiced in the field.

3. In a method as set forth in claim 2 wherein the dominant events from the scanned portion of the subsurface are visually presented as the beam is moved through the sector.

4. In a method as set forth in claim 1 wherein steps (c) through (e) are practiced in an office.

5. In a method as set forth in claim 1 wherein the dominant events from the scanned portion of the subsurface are recorded during the scanning operation.

6. In a method as set forth in claim 1 wherein the scanning operation is performed by variably delaying and adding the seismometer output signals.

7. An improved geophysical method using a receiving system located at a given position and containing a plurality of seismometers and a means for generating seismic disturbances at a plurality of generating points displaced from said receiving system comprising the steps of
   (a) generating seismic energy at each of the generating points displaced from the receiving system,
   (b) developing at the plurality of seismometers output signals created by the receipt of said generated seismic energy,
   (c) focusing said generated seismic energies into a directional beam of seismic energy and focusing the receiving system's response pattern into a directional beam intersecting said beam of seismic energy wherein the signal-to-noise ratio of seismic energy reflected from an interface in the portion of the subsurface located at the intersection of said beams is increased and said receiver system is made relatively insensitive to other seismic energy and noise from outside said intersection,
   (d) presenting as a function of travel time a dominant event indicative of said energy received from said interface located at said intersection of said beams, and
   (e) scanning a larger portion of said subsurface by moving at least one of said beams through a subsurface sector whereby the beams intersect and reflections from interfaces within the new intersection are presented as newly appearing dominant events in accordance with the movement of said beams and the location of said interfaces.

8. In a method as set forth in claim 7 wherein the method is practiced in the field.

9. In a method as set forth in claim 7 wherein the seismic energy is focused by adjusting the phase between the seismic energies generated so that they arrive in phase at the portion of the subsurface located at the intersection of the beams, and the receiving system's response pattern is focused by adjusting the reflections originating from the interface in said portion of the subsurface located at the intersection of said beams to the same point in time and adding the output signals containing said adjusted reflections.

10. In a method as set forth in claim 7 wherein steps (a) and (b) are performed in the field and steps (c) through (e) are performed in the office.

11. In a method as set forth in claim 8 wherein the dominant events from the scanned portion of the subsurface are visually presented as at least one of the beams is moved through the sector.

12. An improved geophysical method of subsurface exploration using a receiving system located at a given position and containing a plurality of seismometers and means for generating seismic disturbances at a plurality of generating points displaced from said receiving system comprising the steps of
   (a) generating frequency varying continuous wave seismic energy at each of the generating points displaced from the receiving system,
   (d) developing at the plurality of seismometers continuous wave output signals created by the receipt of said generated seismic energy,
   (c) developing a suitable time base signal,
   (d) focusing the receiving system's response pattern into a directional beam intersecting a portion of said beam of seismic energy at an interface in the subsurface by adjusting the reflections in said output signals from said interface to a common point in time whereby a major number of reflections from other subsurface interfaces are out of adjustment, and adding said output signals,
   (e) presenting the sum as a function of travel time wherein a dominant event in said sum represents energy from said interface, and thereafter
   (f) scanning a portion of the subsurface by moving said beam through a subsurface sector whereby reflections from interfaces within said subsurface sector are presented as newly appearing dominant events in accordance with the movement of said beam and the location of said interfaces within said sector.

13. In a method as set forth in claim 12 wherein seismic signals are recovered from the continuous wave output signals before the receiving system's response pattern is focused.

14. An improved geophysical method of subsurface exploration using a receiving system located at a given position and containing a plurality of seismometers and means for generating seismic disturbances at a plurality of generating points displaced from said receiving system comprising the steps of
 (a) generating frequency varying continuous wave seismic energy at each of the generating points displaced from the receiving system,
 (b) developing at the plurality of seismometers continuous wave output signals created by the receipt of said generated seismic energy,
 (c) developing a suitable time base signal,
 (d) focusing said continuous wave seismic energy into a directional beam of seismic energy, and focusing the receiving system's response pattern into a directional beam intersecting a portion of said beam of seismic energy wherein the signal-to-noise ratio of said receiving system to seismic energy reflected from the portion of the subsurface located at the intersection of said beams is increased and said receiving system is made relatively insensitive to other seismic energy and noise, and
 (e) presenting an indication of said energy received from said portion of said subsurface located at the intersection of said beam.

15. In a method as set forth in claim 14 wherein seismic signals are recovered from the continuous wave output signals before at least one of the focusing operations.

16. In a method as set forth in claim 14 wherein the seismic energy is focused by adjusting the phase between the generated seismic energy so that said energy arrives substantially in phase at the portion of the subsurface located at the intersection of the beams and the receiving system's response pattern is focused by adjusting the reflections originating from an interface in said portion of the subsurface to a common point in time and adding the seismic signals recovered from the continuous wave output signals.

17. In a method as set forth in claim 14 wherein the time base is established from a reference signal similar to the frequency varying continuous wave signals generated at said generating points.

18. In a method as set forth in claim 17 wherein the reference signal is received from a location adjacent a given generating point.

19. In a method as set forth in claim 17 wherein the reference signal is prerecorded prior to the generation of the frequency varying continuous wave seismic signals.

20. In a method as set forth in claim 17 wherein the seismic signals are recovered from the continuous wave output signals by pattern matching.

21. In a method as set forth in claim 17 wherein the seismic signals from the continuous wave output signals are recovered by correlation with a reference signal.

22. In a method as set forth in claim 14 wherein the generated frequency varying continuous wave seismic energy is maintained in a given phase relationship during focusing operations, said given relationship being a function of distance between said generating points.

23. In a method as set forth in claim 14 wherein the direction of at least one of the beams is moved through a sector of the subsurface until a desired interface is illuminated.

24. In a method as set forth in claim 14 wherein the directions of both beams are moved through sectors of the subsurface.

25. An improved geophysical method of subsurface exploration using a receiving system located at a given position and containing a plurality of seismometers and means for generating seismic disturbances at a plurality of generating points displaced from said receiving system comprising the steps of
 (a) generating frequency varying continuous wave seismic energy at each of the generating points displaced from the receiving system,
 (b) developing at the plurality of seismometers continuous wave output signals created by the receipt of said generated seismic energy,
 (c) developing a suitable time base signal,
 (d) focusing said continuous wave seismic energy into a directional beam of seismic energy by adjusting the phase between the generated seismic energy so that said energy arrives substantially in phase at an interface of the subsurface, and thereafter
 (e) scanning a portion of the subsurface by moving said beam through a subsurface sector whereby reflections from interfaces within said subsurface sector are presented as newly appearing dominant events in accordance with the movement of said beam and the location of certain interfaces within said sector.

26. In a method as set forth in claim 25 wherein seismic signals are recovered from the continuous wave output signals before the focusing operation.

References Cited

UNITED STATES PATENTS

| | | | |
|---|---|---|---|
| 2,706,011 | 4/1955 | Bayhi | 181—0.5 |
| 2,745,507 | 5/1956 | Bodine | 181—0.5 |
| 2,981,928 | 4/1961 | Crawford et al. | 181—0.5 |
| 3,142,815 | 7/1964 | Picou | 181—0.5 X |
| 3,206,727 | 9/1965 | Picou | 340—15.5 |
| 3,209,855 | 10/1965 | Prickett et al. | |

RODNEY D. BENNETT, *Primary Examiner.*

BENJAMIN A. BORCHELT, *Examiner.*

M. F. HUBLER, *Assistant Examiner.*